United States Patent
Giles et al.

(10) Patent No.: US 6,921,998 B2
(45) Date of Patent: Jul. 26, 2005

(54) ENERGY STORAGE FLYWHEEL AUXILIARY BEARING SYSTEM AND METHOD

(75) Inventors: Todd R. Giles, Phoenix, AZ (US); Paul T. Wingett, Mesa, AZ (US); Calvin C. Potter, Mesa, AZ (US); Sharon K. Brault, Chandler, AZ (US)

(73) Assignee: Honeywell International, Inc., Morristown, NJ (US)

(*) Notice: Subject to any disclaimer, the term of this patent is extended or adjusted under 35 U.S.C. 154(b) by 103 days.

(21) Appl. No.: 10/686,874

(22) Filed: Oct. 15, 2003

(65) Prior Publication Data

US 2005/0082928 A1 Apr. 21, 2005

(51) Int. Cl.[7] .............................................. H02K 7/02
(52) U.S. Cl. ..................... 310/90.5; 310/74; 310/90
(58) Field of Search .......................... 310/90.5, 74, 90, 310/68 B; 384/522; 324/207.11

(56) References Cited

U.S. PATENT DOCUMENTS

| | | | |
|---|---|---|---|
| 4,108,424 A | 8/1978 | Rizzo | |
| 5,021,697 A | 6/1991 | Kralick | |
| 5,525,092 A | 6/1996 | Hirano et al. | |
| 5,708,312 A | 1/1998 | Rosen et al. | |
| 5,739,609 A | 4/1998 | Ueyama et al. | |
| 5,747,907 A * | 5/1998 | Miller | 310/90 |
| 6,524,005 B2 | 2/2003 | Bridges | |
| 6,566,775 B1 * | 5/2003 | Fradella | 310/90.5 |

* cited by examiner

Primary Examiner—Dang Le
Assistant Examiner—Leda Pham
(74) Attorney, Agent, or Firm—Douglas A. Mullen, Esq.

(57) ABSTRACT

An energy storage flywheel system includes a shaft, one or more primary bearing assemblies, and one or more secondary bearing assemblies. A secondary bearing control circuit determines the operability of the primary bearing assemblies and, based on this determination, selectively engages the secondary bearing assemblies to rotationally support the flywheel shaft.

23 Claims, 8 Drawing Sheets

ENERGY STORAGE FLYWHEEL AUXILIARY BEARING SYSTEM AND METHOD

TECHNICAL FIELD

The present invention relates to energy storage flywheel systems and, more particularly, to a system and method of providing back-up rotational support for an energy storage flywheel system.

BACKGROUND

Many satellites and other spacecraft, as well as some terrestrial stationary and vehicle applications, such as seagoing vessels, can include one or more energy storage flywheel systems to provide both a backup power source and to provide attitude control for the vehicle. In such systems, each flywheel system is controlled and regulated to balance the electrical demand in the vehicle electrical distribution system, and may also be controlled in response to programmed or remote attitude (or torque) commands received by a main controller in the vehicle.

Many energy storage flywheel systems include one or more components that are rotationally supported within a housing assembly. These components, which may be referred to as the rotating group, include, for example, an energy storage flywheel, a motor/generator, and a shaft. In particular, the energy storage flywheel and motor/generator may be mounted on the shaft, which may in turn be rotationally supported in the housing assembly via one or more bearing assemblies. In many instances, the shaft is rotationally supported using one or more primary bearing assemblies, and one or more secondary, or back-up, bearing assemblies. For example, in many satellite and spacecraft applications, the flywheel system may include one or more magnetic bearing assemblies that function as the primary bearing assemblies, and one or more mechanical bearing assemblies that function as the secondary bearing assemblies. Typically, the primary bearing assemblies are used to rotationally support the rotating group, while the secondary bearing assemblies are otherwise disengaged from the rotating group. If one or more of the primary bearing assemblies is deactivated due, for example, to a malfunction, or otherwise becomes inoperable to rotationally support the rotating group, the secondary bearing assemblies will then engage, and thereby rotationally support, the rotating group.

In some systems, the secondary bearing assemblies are fixedly mounted and, upon deactivation of the primary bearing assemblies, the shaft is brought into contact with the secondary bearing assemblies. While safe and generally effective, this configuration can cause damage to either or both the shaft and secondary bearing assemblies if the shaft is rotating at a relatively high speed when the primary bearing assemblies are deactivated.

In other systems, the secondary bearing assemblies are spring loaded, or otherwise biased, toward either the engaged or disengaged position. If the secondary bearing assemblies are spring loaded toward the disengaged position, then in order to move the secondary bearing assemblies to the engaged position, an actuator may be energized to overcome the spring load and move the bearing assemblies to the engaged position. Conversely, if the secondary bearing assemblies are spring loaded toward the engaged position, then in order to move the secondary bearing assemblies to the disengaged position, an actuator may be energized to overcome the spring load and move the bearing assemblies to the disengaged position. In either of these instances, the actuator may be configured to rapidly move the secondary bearing assemblies into contact with the shaft. This configuration, too, can cause damage to the shaft and/or secondary bearing assemblies if the shaft is rotating at a relatively high speed when the primary bearing assemblies are deactivated.

Hence, there is a need for an auxiliary, or secondary, bearing assembly system that improves on one or more of the above-noted drawbacks. Namely, a bearing assembly system that substantially eliminates, or at least lessens the likelihood of, damage occurring to the shaft and/or secondary bearing assemblies when the secondary bearing assemblies are engaged while the shaft is rotating at relatively high speeds. The present invention addresses one or more of these needs.

BRIEF SUMMARY

The present invention provides an auxiliary bearing system and method that substantially eliminates damage to the shaft and/or secondary bearing assemblies when the secondary bearing assemblies are engaged while the shaft is rotating at relatively high speeds.

In one embodiment, and by way of example only, an energy storage flywheel system includes a shaft, a flywheel assembly, one or more primary bearing assemblies, one or more secondary bearing assemblies, one or more secondary bearing position sensors, a secondary bearing control circuit, and one or more secondary bearing actuators. The flywheel assembly is mounted on the shaft. The primary and secondary bearing assemblies are each configured to selectively rotationally support the shaft. The secondary position sensors are each configured to supply position signals representative of a position of one or more of the secondary bearing assemblies. The secondary bearing control circuit is adapted to receive one or more signals representative of primary bearing assembly operability and the secondary bearing assembly position signals and is operable, in response thereto, to selectively supply actuator control signals. The secondary bearing actuator assemblies are each coupled to one or more of the secondary bearing assemblies. The actuator assemblies are each further coupled to receive the actuator control signals from the control circuit and are operable, in response thereto, to move the secondary bearing assemblies to one of an engage position, in which each secondary bearing assembly rotationally supports the shaft, and a disengage position, in which each secondary bearing assembly does not rotationally supports the shaft.

In another exemplary embodiment, an auxiliary bearing control system for a system having a shaft and one or more primary bearing assemblies includes one or more secondary bearing position sensors, a secondary bearing control circuit, and one or more secondary bearing assemblies. Each position sensor is configured to supply position signals representative of a position of one or more of the secondary bearing assemblies. The secondary bearing control circuit is adapted to receive one or more signals representative of primary bearing assembly operability and the secondary bearing assembly position signals and is operable, in response thereto, to selectively supply actuator control signals. Each secondary bearing actuator assembly is coupled to one or more of the secondary bearing assemblies, and is further coupled to receive the actuator control signals from the control circuit and is operable, in response thereto, to move the secondary bearing assemblies to one of an engage position, in which each secondary bearing assembly rotationally supports the shaft, and a disengage position, in which each secondary bearing assembly does not rotationally supports the shaft.

In yet another exemplary embodiment, a method of selectively rotationally supporting a flywheel shaft via one or more secondary bearing assemblies in an energy storage flywheel system having at least a flywheel shaft and one or more primary bearing assemblies configured to selectively rotationally support the flywheel shaft includes determining whether the primary bearing assemblies are operable to rotationally support the flywheel shaft. Upon determining that the primary bearing assemblies are not operable to rotationally support the flywheel shaft, at least one of the secondary bearing assemblies is moved from a disengaged position to an engaged position, to thereby rotationally support the flywheel shaft via the secondary bearing assemblies. A position signal representative of secondary bearing assembly position is supplied at least when one of the secondary bearing assemblies engages the shaft.

Other independent features and advantages of the preferred auxiliary bearing system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in a satellite, it will be appreciated that it can be implemented in other systems and environments, both terrestrial and extraterrestrial.

Figure 1:
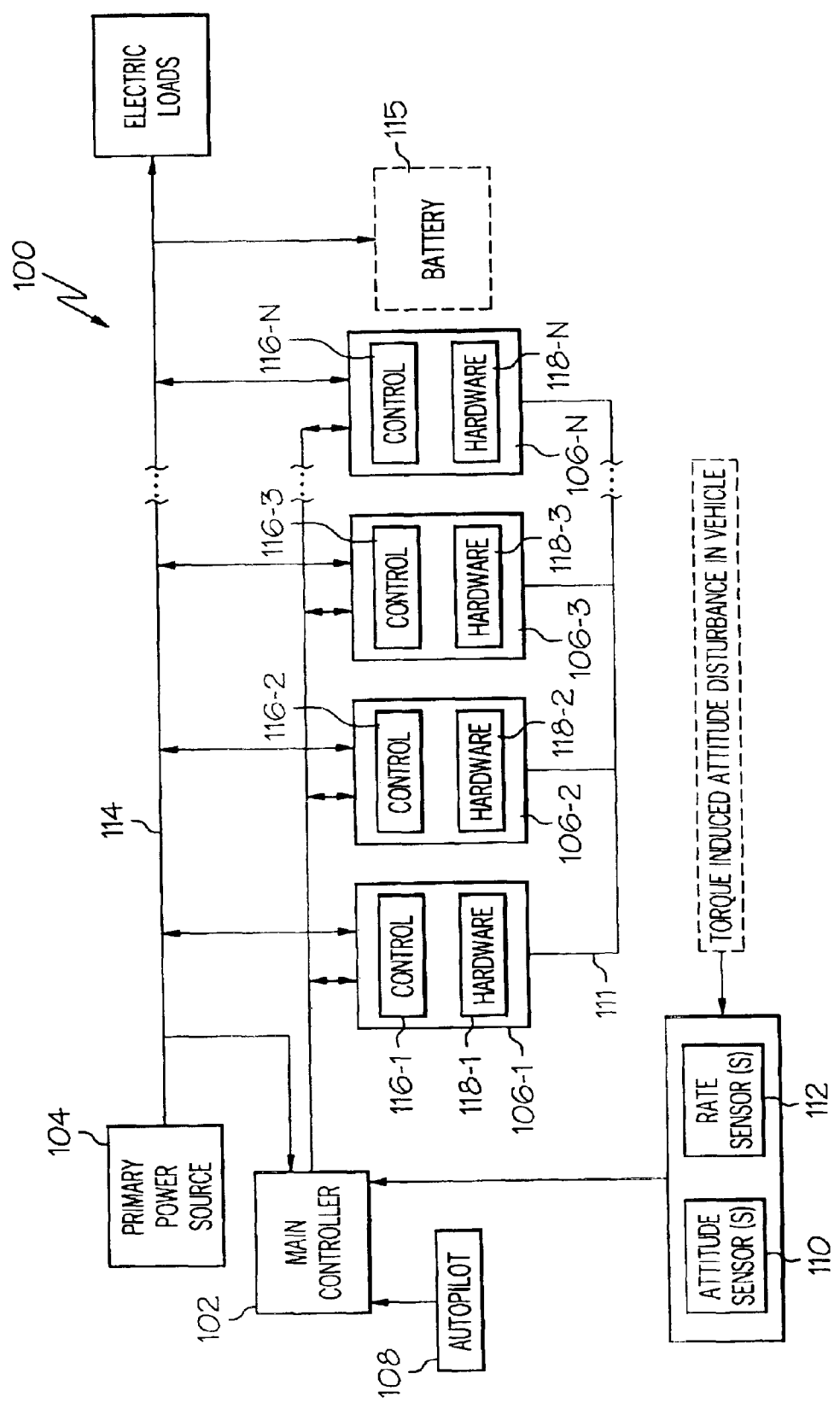
FIG. 1 is a simplified schematic representation of an exemplary energy storage flywheel system that includes an exemplary embodiment of a retention system in a disengaged configuration.
Figure 2:
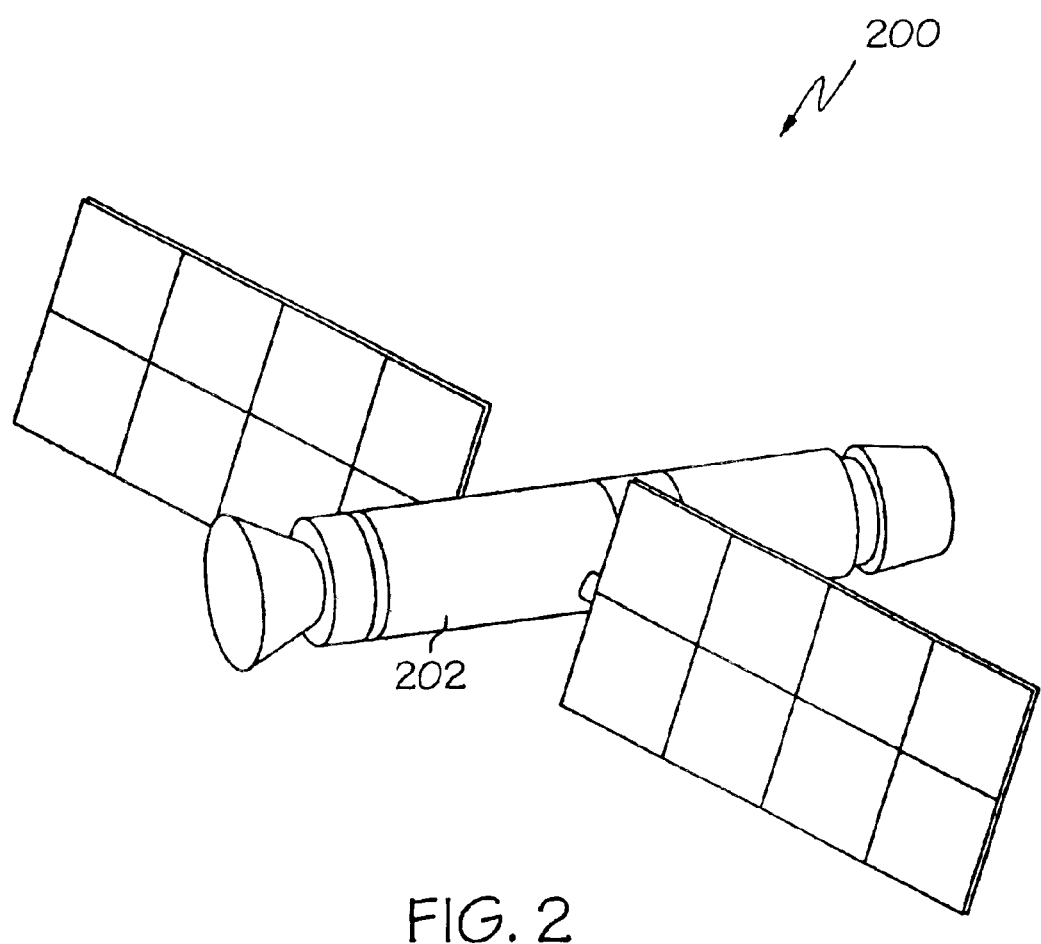
FIG. 2 is a simplified schematic representation of the system shown in FIG. 1, but with the exemplary retention system in an engaged configuration.

Turning now to the description and with reference first to FIG. 1, a functional block diagram of an exemplary power and attitude control system 100 for a spacecraft is shown. The system 100 includes a main controller 102, a primary power source 104, and a plurality of flywheel systems 106 (106-1, 106-2, 106-3, . . . 106-N). A perspective view of an exemplary physical embodiment of a spacecraft 200 that may use the system 100 is illustrated in FIG. 2.

The main controller 102 receives attitude commands (or torque commands) from, for example, an earthbound station or its onboard autopilot 108, and monitors the electrical distribution system 114, and appropriately controls the operation of the flywheel systems 106. In response to the torque commands, the flywheel systems 106 are controlled to induce appropriate attitude disturbances in the spacecraft, and thereby control spacecraft attitude. In addition, depending upon the state of the electrical distribution system 114, the flywheel systems 106 are controlled to either supply electrical energy to, or draw electrical energy from, the electrical distribution system. One or more spacecraft dynamic sensors, such as one or more attitude sensors 110 and one or more rate sensors 112, sense spacecraft attitude and attitude rate-of-change, respectively, and supply feedback signals representative thereof to the main controller 102. A more detailed description of the main controller 102 and the process it implements to control power and attitude is provided further below.

The primary power source 104, as its name connotes, is the primary source of electrical power to the electrical distribution system 114. In the depicted embodiment, in which the system 100 is implemented in a spacecraft, the primary power source 104 is one or more solar panels, each of which includes an array of solar cells to convert light energy into electrical energy. The solar panels 104 may be attached to the satellite itself or to fixed or moveable structures that extend from the satellite. When the spacecraft 200 is positioned such that it does not receive sunlight, such as, for example, when it is in the Earth's shadow, a backup electrical power source is needed. As was alluded to above, in addition to providing attitude control, the flywheel systems 106 also function as a backup power source. The flywheel systems 106 may also provide electrical power if the power demanded by the electrical loads exceeds the capacity of the primary power source 104. It will be appreciated that another backup power source, such as a battery 115 (shown in phantom in FIG. 1), may also be provided.

The system 100 includes N number of energy storage flywheel systems 106 (106-1, 106-2, 106-3, . . . 1-6-N). The system 100 is preferably configured so that some of the flywheel systems 106 are active, while one or more of the remaining flywheel systems 106 is in a standby, inactivated state. Thus, the system 100 is at least single fault tolerant. The number of flywheel systems 106 that are active may vary, depending on system requirements. As will be discussed more fully below, in a particular preferred embodiment, four flywheel systems 106 are active and the remaining are inactive.

Figure 3:
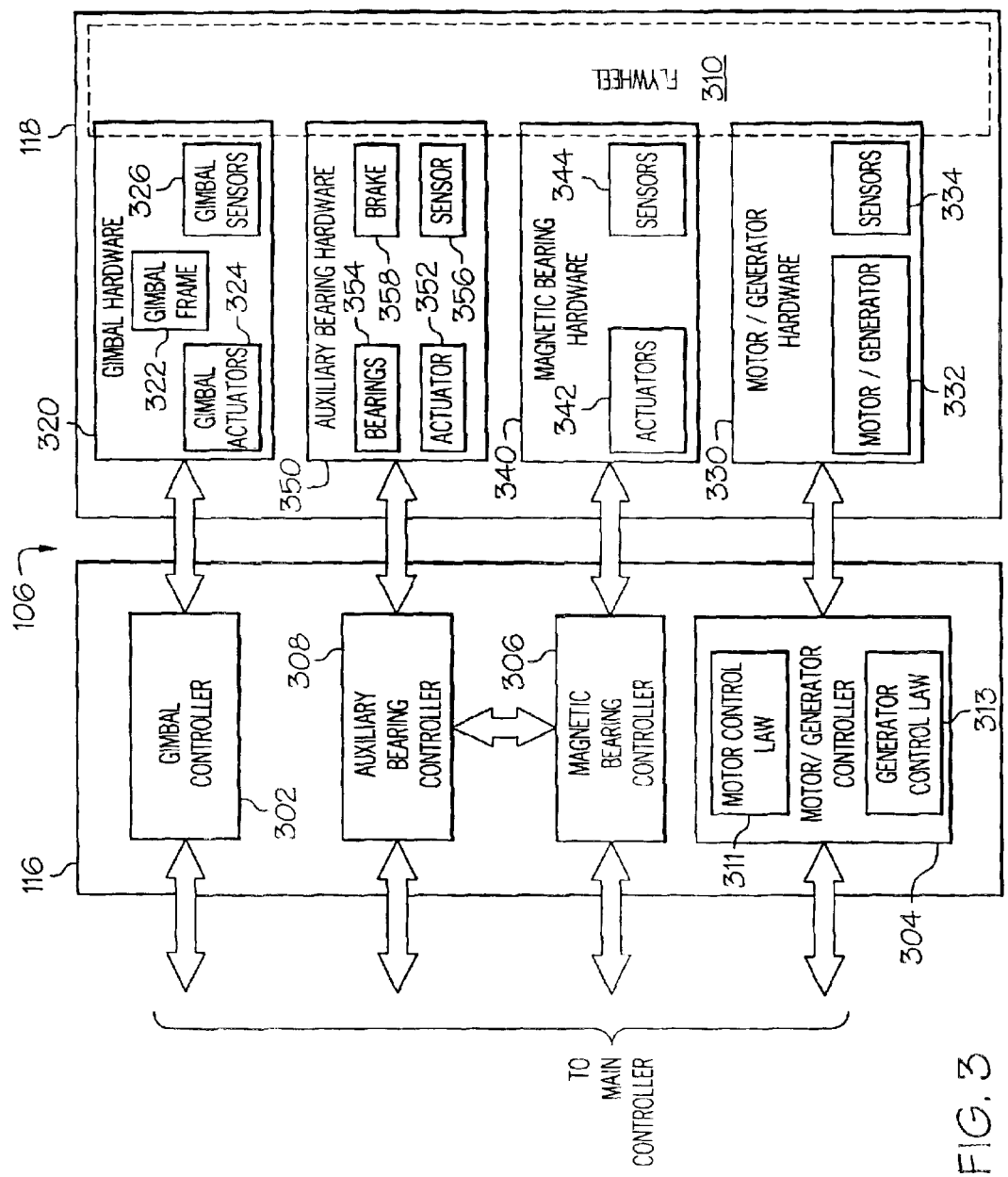
FIG. 3 is a functional block diagram of an exemplary embodiment of one energy storage flywheel system that may be used in the system of FIG. 1.

The flywheel systems 106 each include a flywheel control module 116 (116-1, 116-2, 116-3, . . . 116-N) and flywheel hardware 118 (118-1, 118-2, 118-3, . . . 118-N). The flywheel control modules 116 are each in operable communication with the main controller 102 and, in the depicted embodiment, are in communication with one another via a data bus 111. The main controller 102, as was noted above, supplies attitude control commands to the each of the flywheel control modules 116. In turn, the flywheel control modules 116 control the relative attitudes and angular velocities of the associated flywheel hardware 118 to effect attitude control of the spacecraft 200. The flywheel control modules 116 also respond to commands from the main controller 102 to control the operation of the associated flywheel hardware 118 in either a motor mode or a generator mode, and the rotational acceleration of the associated flywheel hardware 118 in each mode. The flywheel control modules 116, as is discussed in more detail below, also monitor various parameters of the associated flywheel hardware 118, and supply representative signals to the main controller 102. A block diagram of an exemplary embodiment of one flywheel system 106 is illustrated in FIG. 3, and will now be discussed in detail.

In the depicted embodiment, the flywheel control modules 116 each include four separate controllers, a gimbal controller 302, a motor/generator controller 304, a magnetic bearing controller 306, and an auxiliary bearing controller 308. The flywheel hardware 118 each include an energy storage flywheel assembly 310, gimbal hardware 320, motor/generator hardware 330, magnetic bearing hardware 340, and auxiliary bearing hardware 350. The gimbal controller 302 receives gimbal angle velocity commands from the main controller 102, and supplies appropriate control signals to, and receives various feedback signals from, the gimbal hardware 320, to effect attitude control. At least some of the feedback signals the gimbal controller 320 receives are representative of the gimbal hardware 320 response to the supplied control signals. The gimbal controller 302 also supplies these feedback signals to the main controller 102.

In the depicted embodiment, the gimbal hardware 320 is a gimbal frame that includes one or more gimbal assemblies 322, one or more gimbal actuators 324, and one or more gimbal sensors 326. The flywheel assembly 310 is rotationally mounted in the gimbal frame 320, about a gimbal axis, via the gimbal assemblies 322. The gimbal axis is perpendicular to the spin axis of the energy storage flywheel assembly 310. The gimbal actuator 324 is coupled to the gimbal frame 320, and is also coupled to receive the control signals from the gimbal controller 302. As is generally known, attitude control in a spacecraft may be implemented by changing the gimbal angles at certain rates (e.g., angular velocities). Thus, in response to the commands received from the main controller 102, the gimbal controller 302 supplies appropriate control signals to the gimbal actuators 324. In response to these control signals, the gimbal actuators appropriately position the flywheel assembly 310 with respect to the gimbal frame 320 at the appropriate angular velocities. The gimbal sensors 326 include sensors that can sense at least the position and rate of the flywheel with respect to the gimbal frame 320, and supply position and rate feedback signals to the gimbal controller 302 and to the main controller 102.

The motor/generator controller 304 receives a signal representative of the bus voltage of the electrical distribution system 114 and, in response, configures the motor/generator hardware 330 to operate as either a motor or a generator. The motor/generator controller 304 also receives commands from the main controller 102 and, in response, controls the rotational acceleration of the motor/generator and thus the flywheel assembly 310. To do so, the motor/generator controller 304 is configured to selectively implement either a motor control law 311 or a generator control law 313. The motor/generator controller 304 also receives various feedback signals from the motor/generator hardware 330. At least some of the feedback signals received by the motor/generator controller 304 are representative of the motor/generator hardware 330 response to the supplied control signals. The motor/generator controller 304 supplies one or more of the feedback signals it receives from the motor/generator hardware 330 to the main controller 102.

The motor/generator hardware 330 includes a motor/generator 332 and one or more sensors 334. The motor/generator 332 may be any one of numerous motor/generator sets known now, or in the future, and includes a main rotor that is coupled to the rotor of the flywheel assembly 310. The sensors 334 include one or more temperature sensors and one or more commutation sensors. When the bus voltage of the electrical distribution system 114 is sufficiently high, the motor/generator controller 304 implements the motor control law 311 and the motor/generator 332 is operated as a motor. During operation as a motor, the motor/generator 332 spins up the flywheel assembly 310, to store rotational kinetic energy. Conversely, when the bus voltage of the electrical distribution system 114 drops to some predetermined magnitude, the motor/generator controller 304 implements the generator control law 313 and the motor/generator 332 is operated as a generator. During its operation as a generator, the motor/generator 332 spins down the flywheel assembly 310, converting the flywheel's stored rotational kinetic energy to electrical energy. As was previously discussed, changes in the rotational speed of the flywheel assembly 310 can impact the attitude of the spacecraft. Thus, in both the motor mode and generator mode, the flywheel assembly 310 is spun up, or spun down, to a rotational velocity at an acceleration commanded by the main controller 102.

The magnetic bearing controller 306 may also receive one or more commands from the main controller 102. The magnetic bearing controller 306, in accordance with a control law, supplies appropriate command signals to, and receives various feedback signals from, the magnetic bearing hardware 340. At least some of the feedback signals received by the magnetic bearing controller 306 are representative of the magnetic bearing hardware 340 response to the supplied control signals. As will be described in more detail further below, the magnetic bearing controller 306, at least in the depicted embodiment, supplies one or more of the feedback signals it receives to the auxiliary bearing controller 308. Moreover, similar to the gimbal controller 302, the magnetic bearing controller 306 may additionally supply one or more of the feedback signals it receives to the main controller 102.

The magnetic bearing hardware 340 functions to rotationally support or levitate, in non-contact fashion, the energy storage flywheel assembly 310, and is the primary bearing system for the energy storage flywheel assembly 310. In the depicted embodiment, the magnetic bearing hardware 340 implements active magnetic bearings, and includes electromagnetic actuators 342 and one or more sensors 344 such as, for example, position sensors, temperature sensors, and speed sensors. The position sensors 344 sense the position of the flywheel rotor (not illustrated) and supply appropriate position signals to the magnetic bearing controller 306. The magnetic bearing controller 306, in accordance with the control law, supplies the appropriate current magnitude to the electromagnetic actuators 342, which in turn generate magnetic forces of the appropriate magnitude to appropriately position the flywheel rotor. Although active magnetic bearings are described as being implemented in the system shown in FIG. 3, it will be appreciated that the magnetic bearing hardware 340 could be configured to implement passive magnetic bearings. Alternatively, other types of bearing assemblies could be used to implement the primary bearing assemblies such as, for example, non-magnetic rolling element bearings.

The auxiliary bearing controller 308 receives various signals representative of magnetic bearing hardware operability and various feedback signals from the auxiliary bearing hardware 350. In response to these signals, the auxiliary bearing controller 308 supplies appropriate command signals to the auxiliary bearing hardware 350. In particular, as will be described in more detail further below, the auxiliary bearing controller 308 receives a feedback signal representative of the position of the auxiliary bearing hardware. As will also be described further below, the auxiliary bearing controller 308 may additionally receive a signal representative of the bus voltage of the electrical distribution system 114 and, in response, supply appropriate command signals to the auxiliary bearing hardware 350.

The auxiliary bearing hardware 350 is used to rotationally support the energy storage flywheel assembly 310 when the magnetic bearing hardware 340 is inoperable, or is otherwise not capable of properly doing so. The auxiliary bearing hardware 350, a preferred embodiment of which will be described in more detail further below, includes an actuator assembly 352, one or more auxiliary (or secondary) bearing assemblies 354, one or more position sensors 356, and a brake assembly 358. The actuator assembly 352, in response to appropriate command signals from the auxiliary bearing controller 308, moves the auxiliary bearing assemblies 354 to either an engage position or a disengage position. In the disengage position, which is the normal position of the auxiliary bearing assemblies 354, the auxiliary bearing assemblies 354 are disengaged from, and do not rotationally support, the flywheel assembly 310. Rather, the flywheel assembly 310 is rotationally supported by the magnetic bearing hardware 340. Conversely, in the engage position the auxiliary bearing assemblies 354 engage, and rotationally support, the flywheel assembly 310. A more detailed description of a particular preferred embodiment of the auxiliary bearing hardware 350 and the operation of the components that make up the auxiliary bearing hardware 350 will be described in more detail further below.

Figure 4:
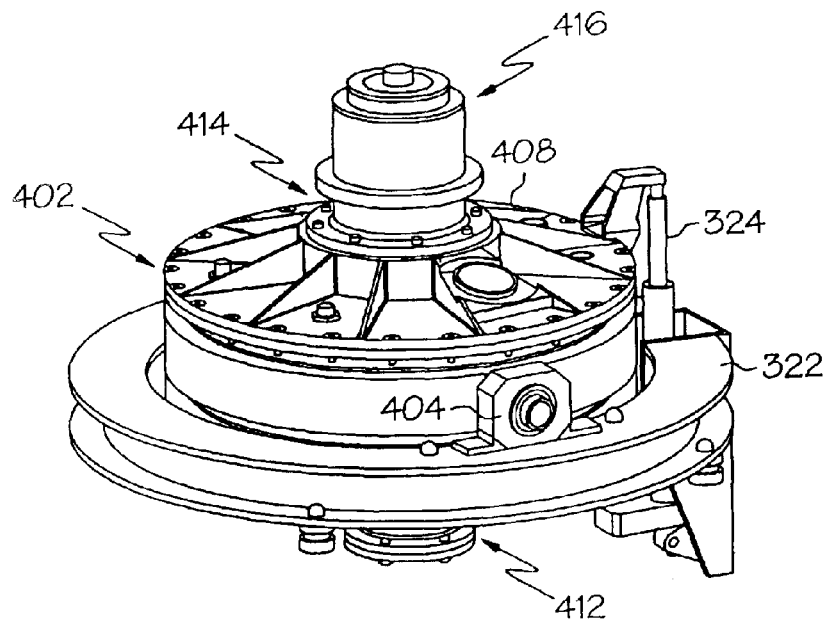
FIGS. 4 and 5 are perspective and cross section views, respectively, of a physical embodiment of the energy storage flywheel system of FIG. 3.
Figure 5:
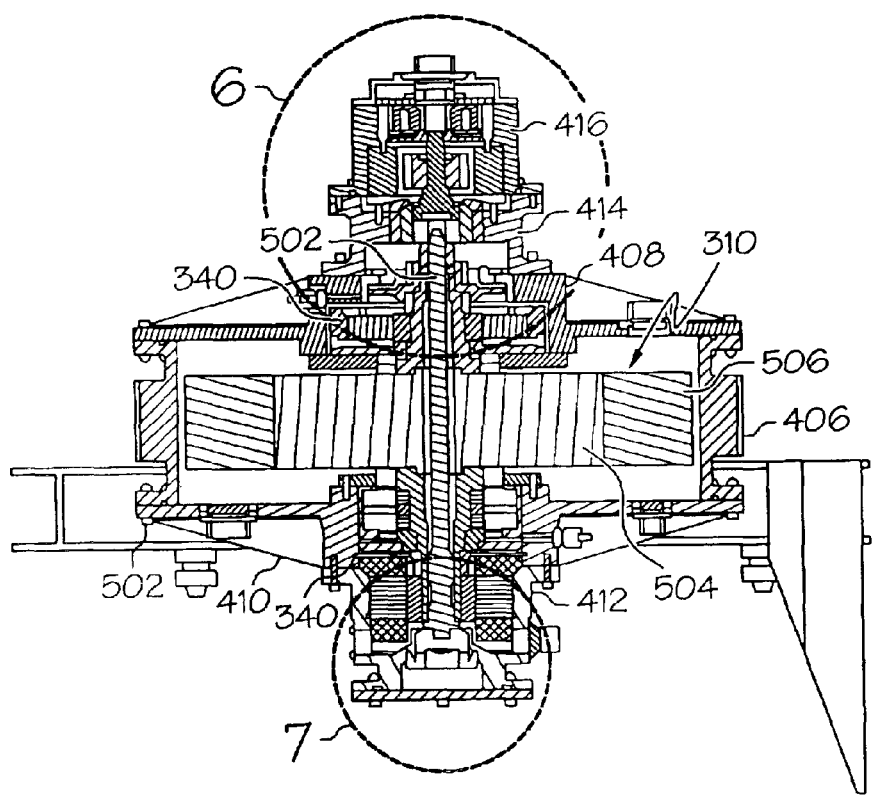

With reference first to FIGS. 4 and 5, which depict an exemplary physical embodiment of an energy storage flywheel system 106, it is seen that the exemplary flywheel system 106 includes a housing assembly 402, which is rotationally mounted in the gimbal frame 322 via two gimbal bearings 404 (only one shown). A single gimbal actuator 324 is mounted on the gimbal frame 322 and, as was noted above, receives control signals from the gimbal controller 302 (not shown in FIGS. 4 and 5) to position the housing assembly 402 at the appropriate angular velocities, to thereby effect attitude control.

The housing assembly 402 includes a central section 406, two end sections 408 and 410, a motor/generator housing 412, an auxiliary bearing housing 414, and an auxiliary motor housing 416. Although the housing assembly 402 is depicted as being constructed of numerous sections that are coupled together, it will be appreciated that it could be formed as an integral structure. In any event, the motor/generator housing 412 is coupled to the housing assembly second end section 410, the auxiliary bearing housing 414 is coupled to the housing assembly first end section 408, and the the auxiliary motor housing 416 is coupled to the auxiliary bearing housing 414.

The motor/generator 332 stator is mounted in the motor/generator housing 412 and the motor/generator 332 rotor is coupled to the flywheel assembly 310. The flywheel assembly 310, as shown more particularly in FIG. 5, includes a shaft assembly 502, a hub 504, and a flywheel rim 506. The shaft assembly 502 is rotationally mounted in the housing assembly 402 via either two sets of the magnetic bearing hardware 340 or, as will be described in more detail further below, two auxiliary bearing assemblies 354a, 354b. The hub 504 is preferably constructed of a high-strength metal alloy, and is mounted on the shaft assembly 502. The hub 504 may be constructed in any one of numerous configurations including, for example, a solid configuration, a spoke-type configuration, or a combination thereof. The flywheel rim 506 is mounted on, and surrounds, the hub 504, and is preferably constructed of a material having a high strength-to-density ratio such as, for example, filament wound carbon fiber.

Figure 6:
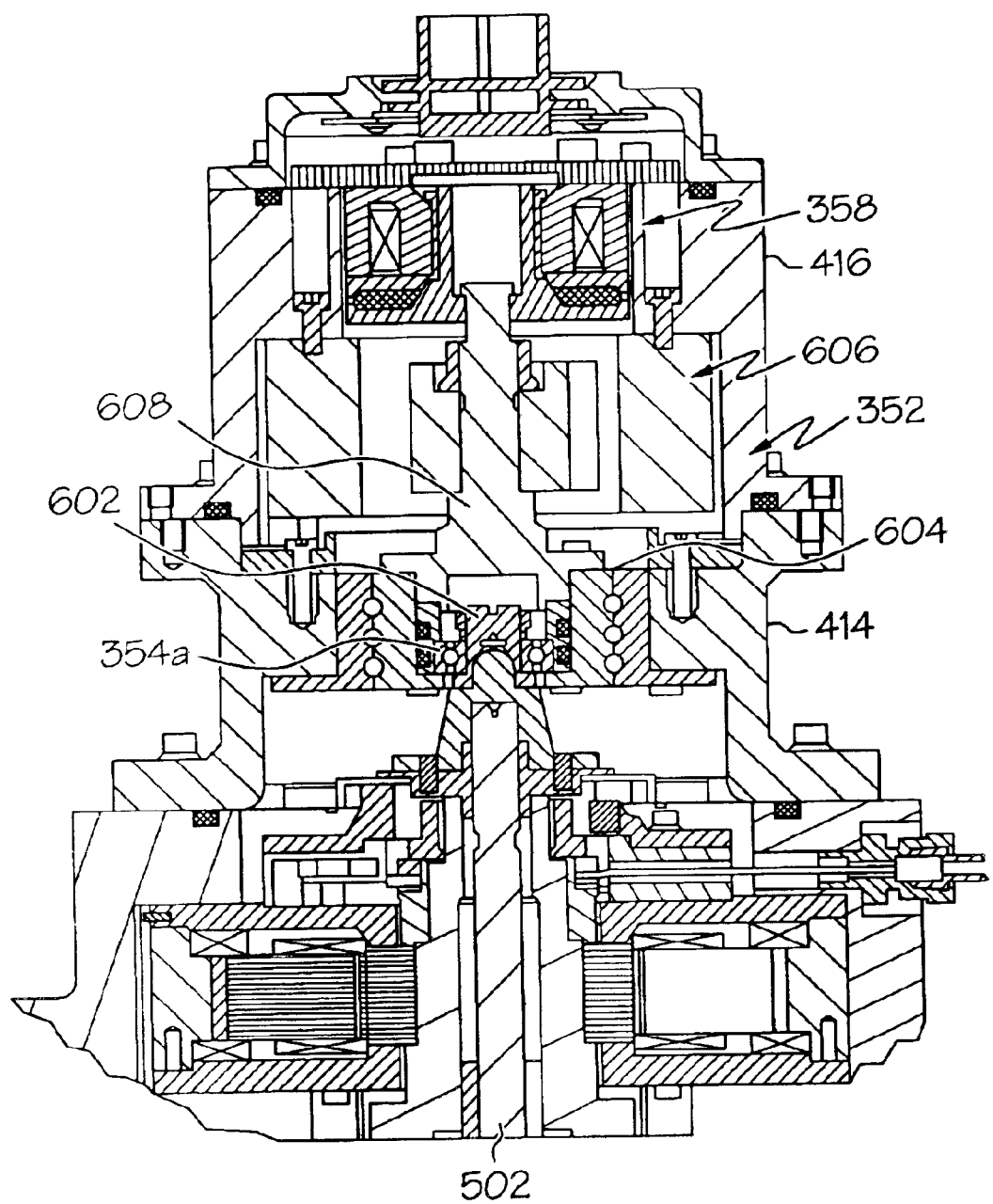
FIGS. 6 and 7 are close-up, partial cross section views of the energy storage flywheel system of FIGS. 4 and 5.
Figure 7:
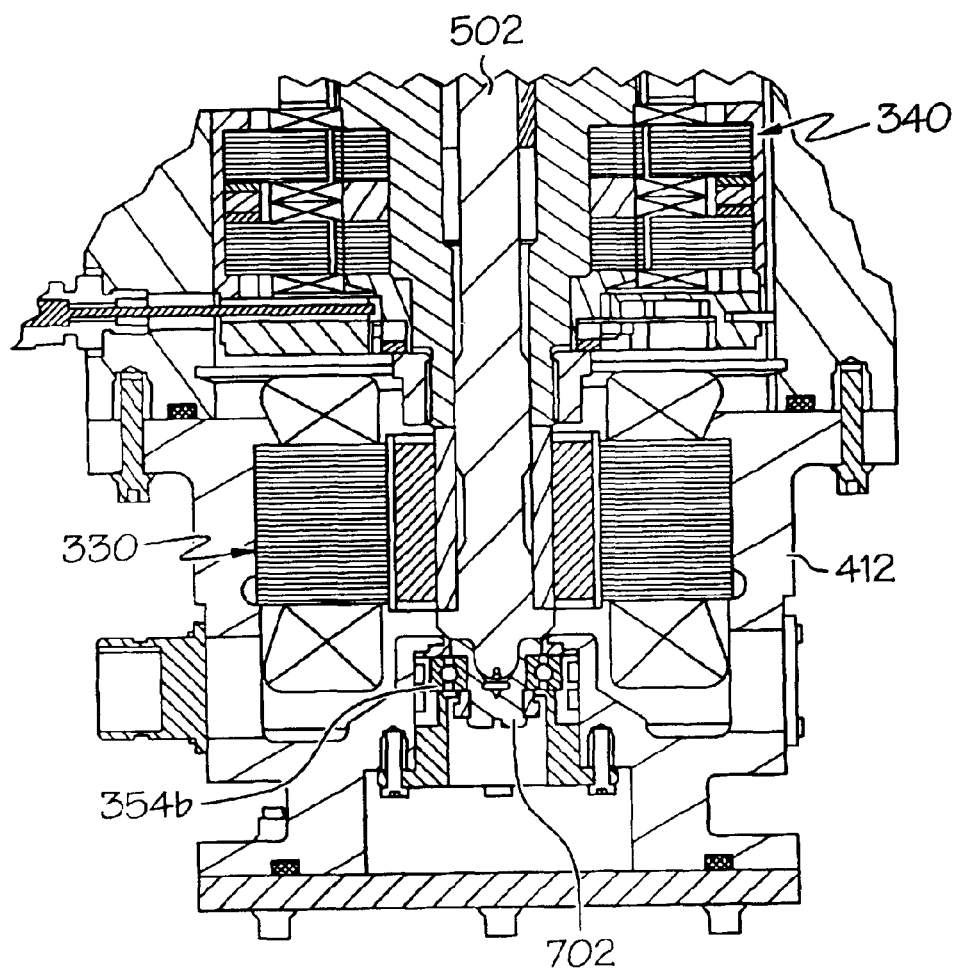

Turning now to FIGS. 6 and 7, close-up views of the auxiliary bearing hardware 350 are shown, and will now be described in more detail. One of the auxiliary bearing assemblies 354a is housed in the auxiliary bearing housing 414, and the other auxiliary bearing assembly 354b is housed within the motor/generator housing 412. The auxiliary bearing assemblies 354a, 354b may be any one of numerous types of non-magnetic bearing assemblies. In the depicted embodiment, however, each is a rolling element bearing assembly, and are mounted on a touchdown cup 602 and 702, respectively. The auxiliary bearing assembly 354a and touchdown cup 602 that are mounted in the auxiliary bearing housing 414 are coupled to the actuator assembly 352. As will be described more fully below, the actuator assembly 352, in response to commands from the auxiliary bearing assembly controller 308, selectively moves the touchdown cup 602 in and out of contact with the flywheel shaft assembly 502, to thereby engage and disengage, respectively, the auxiliary bearing assemblies 354a, 354b.

The auxiliary bearing actuator assembly 352 may be any one of numerous types of actuator assemblies, but in the depicted embodiment it is a ballscrew actuator 604 that is driven by a motor 606. As is generally known, a ballscrew actuator is configured such that at least a portion of the actuator translates in response to receipt of a rotational drive force. The motor 606 is housed in the auxiliary motor housing 416 is coupled to the actuator 604 via a motor output shaft 608 that extends into the auxiliary bearing housing 414. The motor 606 may be any one of numerous types of motors including, but not limited to, hydraulic, pneumatic, and electric. Preferably, however, the motor 606 is electric and, although it could be any one or numerous types of AC or DC motors, it is preferably a DC torque motor. As will be described more fully below, the motor 606 is coupled to receive actuator control signals from the auxiliary bearing control circuit 308 and, in response to the control signals, supplies an appropriate drive force to the actuator 604, which in turn appropriately engages or disengages the auxiliary bearing assemblies 354a, 354b.

The brake assembly 358 is mounted within the auxiliary motor housing 416, and is also coupled to the motor output shaft 608. As will also be described more fully below, the brake assembly 358 is coupled to receive brake control signals supplied from the auxiliary bearing control circuit 308 and, in response, selectively prevents or allows rotation of the motor output shaft 608, and thus selectively prevents or allows movement of the actuator 604 and auxiliary bearing assembly 354a. It will be appreciated that the brake assembly 358 may be implemented using any one of numerous brake types and configurations. In a particular preferred embodiment the brake assembly 358 is a tooth brake assembly that is configured to be engaged when not energized, and is energized to release. This particular preferred embodiment is shown coupled to the actuator assembly 352 in FIG. 8, and will now be described in more detail. It will be appreciated, however, that for clarity of illustration, the actuator assembly 352 is depicted in FIG. 8 without the motor 604 and associated housings.

Figure 8:
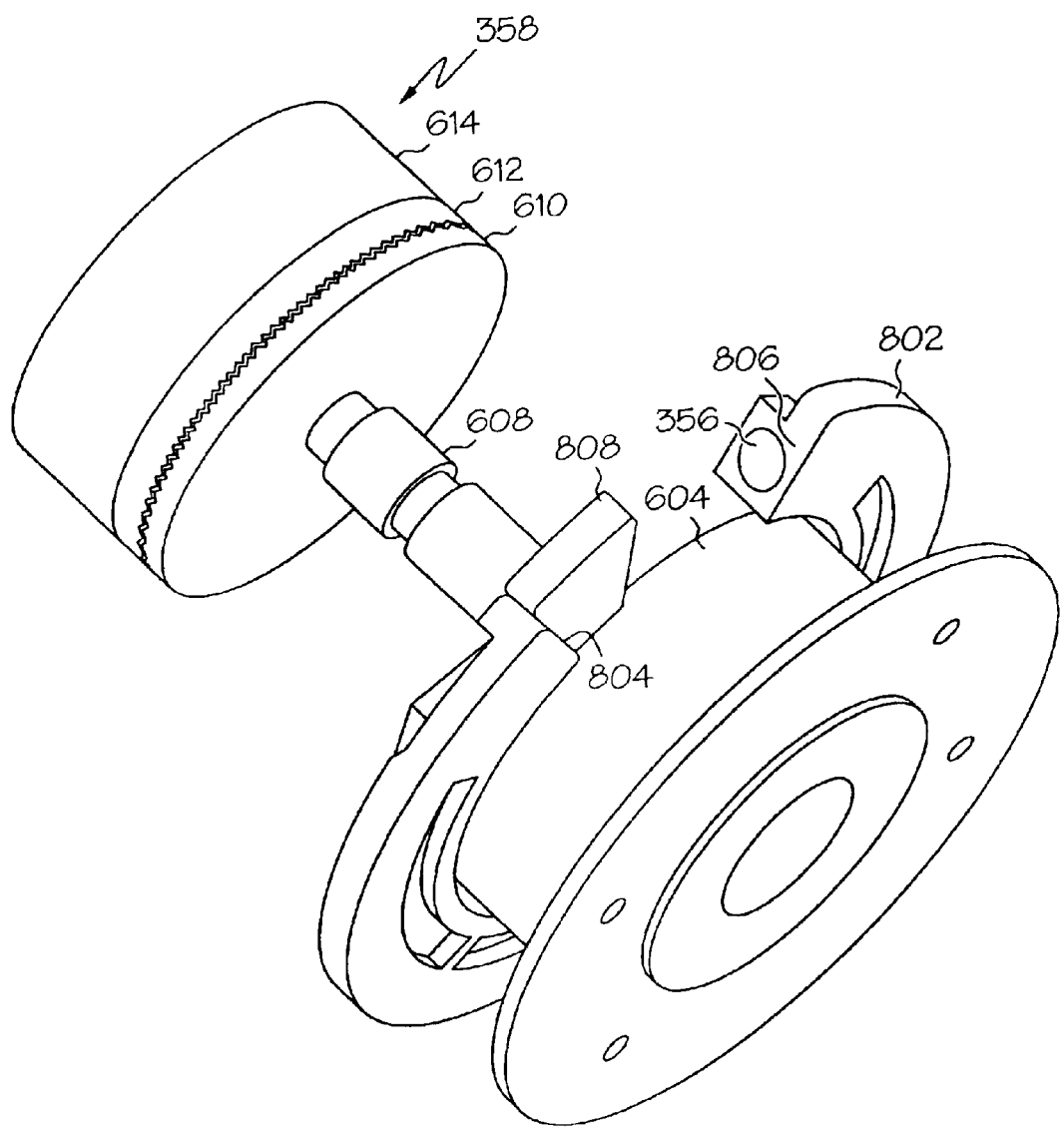
FIG. 8 is a perspective view of a portion of an auxiliary bearing actuator assembly that may be used in the system of FIGS. 3–7.

As FIG. 8 shows, the brake assembly 358 includes a first brake plate 610, a second brake plate 612, and a brake solenoid 614. The first brake plate 610 surrounds, and rotates with, a portion of the motor output shaft 608, and includes an engagement surface 616, and a non-engagement surface 618. The engagement surface 616 includes a plurality of engagement teeth 620, which may be either formed into the first plate engagement surface 616 or separately coupled thereto. With reference to both FIGS. 6 and 8, it is seen that the first brake plate 610 and the section of the motor output shaft 608 that the first brake plate surrounds are configured such that the first brake plate 610 may translate along a portion of the motor output shaft 608. It is noted that the second brake plate 612 is biased toward the first brake plate 610 by a non-illustrated spring, so that when the brake assembly 352 is not energized it will default to the engaged position.

The second brake plate 612 is fixedly mounted in the auxiliary motor housing 416. Similar to the first brake plate 610, the second brake plate 612 includes an engagement surface 622 and a non-engagement surface 624. The second brake plate engagement surface 622 includes a plurality of engagement teeth 626, which may also be formed into the second plate engagement surface 622 or separately coupled thereto. It will be appreciated that the engagement teeth 620 and 626 on the first and second plate engagement surfaces 616 and 622, respectively, are preferably configured to mesh with one another when the first 610 and second 612 brake plates engage one another.

The brake solenoid 614 is coupled to the second brake plate 612 and, in response to the brake actuator signals supplied from the auxiliary bearing controller 308, selectively moves the second brake plate 612 into and out of engagement with the first brake plate 610, thereby disengaging the brake assembly 358. With the brake assembly 358 disengaged, the motor output shaft 608 is free to rotate. Conversely, when the brake solenoid 614 is de-energized, the non-illustrated spring supplies a bias force that moves the second brake plate 612 into engagement with the first brake plate 610, thereby engaging the brake assembly 358. As was noted above, when the brake plates 610, 612 engage one another, the respective engagement teeth 620, 626 mesh with one another. In this position, because the second brake plate 612 does not rotate, the first brake plate 610 is prevented from rotating. Since the first brake plate 610 is coupled to the motor output shaft 608, which is in turn coupled to the actuator 604, actuator movement is prevented.

With continued reference to FIG. 8, a particular preferred configuration and implementation of the auxiliary bearing position sensors 356 will now be described. In the depicted embodiment, two position sensors, an engaged position sensor 356a and a disengaged position sensor 356b, are used. Although the position sensors 356 may be any one of numerous types of known position sensors, in the depicted embodiment, the position sensors 356 are proximity sensors. The position sensors 356 are each mounted in a sensor mount structure 802. The sensor mount structure 802 is substantially C-shaped, includes a first end 804 and a second end 806, and is coupled to the auxiliary bearing actuator 604. The engaged position sensor 356a is mounted to the mount structure first end 802 and the disengaged position sensor 356b is mounted to the mount structure second end 804. As FIG. 8 also shows, a position semaphore 808 is coupled to the motor output shaft 608 and extends between mount structure first 804 and second 806 ends. The position semaphore 808 rotates with the motor output shaft 608. As the position semaphore 808 rotates, it is positioned proximate either the engaged 356a or disengaged 356b position sensor, to indicate that the auxiliary bearing assemblies 354 are engaged or disengaged, respectively. As was noted above, the position sensors 356a, 356b supply signals representative of the position of the auxiliary bearings 354 to the auxiliary bearing controller 308.

Figure 9:
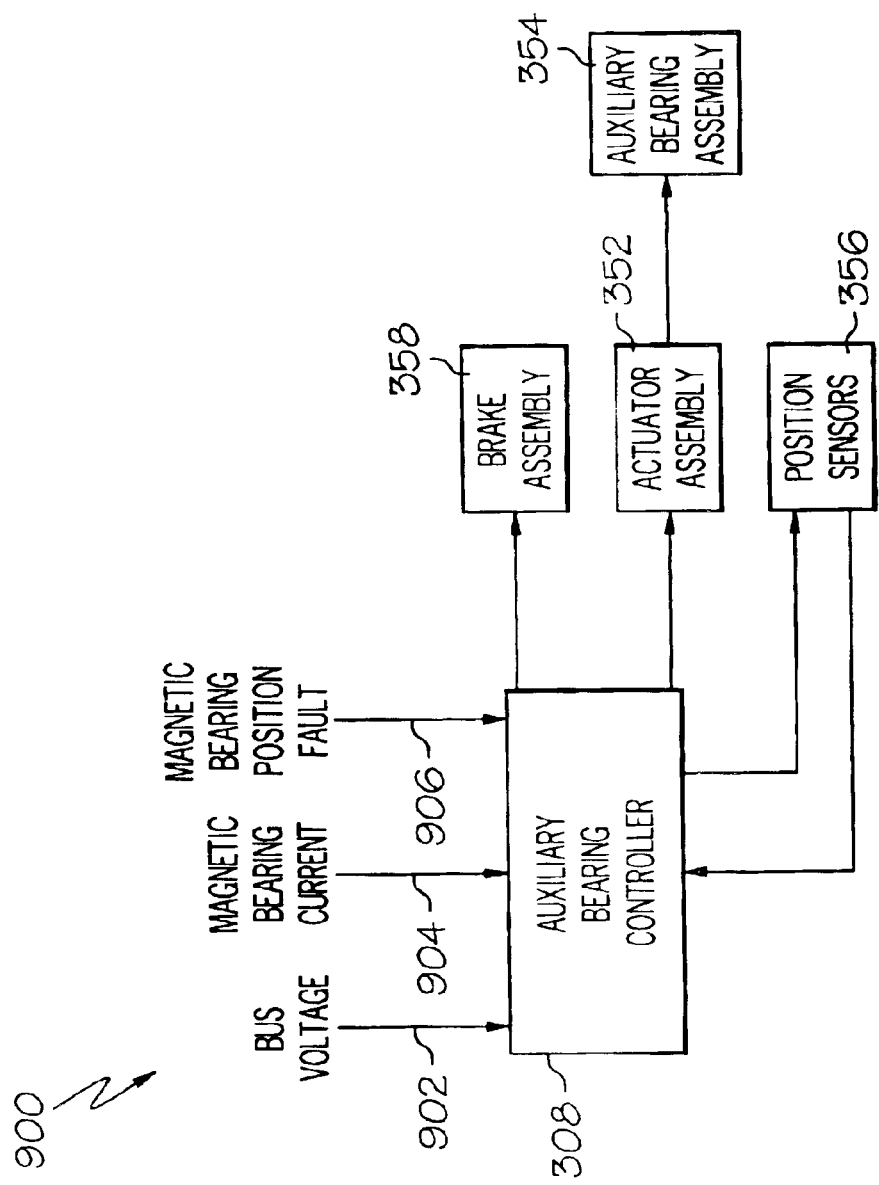
FIG. 9 is a functional block diagram of an exemplary auxiliary bearing system that may be used in the system of FIGS. 3–7.

The auxiliary bearing system, the components that make up the auxiliary bearing system, and implementation of the auxiliary bearing system into a physical environment, such as an energy storage flywheel system 106, have been described. With reference now to FIG. 9, which depicts a particular preferred embodiment of the auxiliary bearing system 900 apart from the remaining components, systems, and subsystems that make up an energy storage flywheel system 106, the operation of the auxiliary bearing system 900 will now be described.

The auxiliary bearing controller 308, as was noted above, receives a signal representative of electrical distribution system bus voltage 902, and signals representative of magnetic bearing hardware operability. In the depicted embodiment, these latter signals include a signal representative of magnetic bearing current 904 and a signal representative of magnetic bearing position fault 906. It will be appreciated that these are merely exemplary of the types of signals that may be used to indicate magnetic bearing hardware operability. It will additionally be appreciated that these signals may be supplied from various signal sources within the flywheel system 106. In the depicted embodiment, however, these signals, as shown in FIG. 3, are supplied from the magnetic bearing controller 306. The auxiliary bearing controller 308 is also configured to receive position signals from each of the auxiliary bearing positions sensors 354a, 354b. In the depicted embodiment, the auxiliary bearing controller 308 supplies appropriate power and/or excitation to the position sensors 354a, 354b, though it will be appreciated that this could come from other sources.

In most circumstances, the flywheel system 106 into which the auxiliary bearing system 900 is installed uses the magnetic bearings to 340 to rotationally support the flywheel shaft assembly 502. However, if one or more of the signals 902–906 supplied to the auxiliary bearing controller indicate that one or more of the magnetic bearings is inoperable, misaligned, or otherwise incapable of rotationally supporting the flywheel shaft assembly 502, the auxiliary bearing controller 308 will then command the auxiliary bearing assemblies 354a, 354b to engage the flywheel shaft assembly 502. To do so, the auxiliary bearing controller 308 supplies an appropriate brake release command signal to the brake assembly 358, to thereby release the brake assembly 358 and allow movement of the auxiliary bearing actuator assembly 352. As was described above, in a particular preferred embodiment, the brake release command signal is merely an appropriate power signal that energizes the brake solenoid 614, which causes the first 610 and second 612 brake plates to disengage one another.

Upon release of the brake assembly 358, or substantially simultaneous with supplying the brake release command, the auxiliary bearing controller 308 additionally supplies an appropriate command signal to the auxiliary bearing actuator assembly 352. For the particular preferred embodiment described above, the auxiliary bearing controller 308 supplies a signal of appropriate polarity to the DC torque motor 606 to cause it to rotate, and thus supply a drive force, in the engage direction. In response to the drive force supplied from the torque motor 606, the actuator 604 translates, which in turn translates the touchdown cup 602 into contact with the flywheel shaft assembly 502, which in turn causes the flywheel shaft assembly to engage the other touchdown cup 702. Since the auxiliary bearing assemblies 354a and 354b are mounted on the touchdown cups 602 and 702, respectively, the flywheel shaft assembly 502 will then be rotationally supported by the auxiliary bearing assemblies 354a, 354b.

As the torque motor 606 begins rotating in the engage direction, the position semaphore 808 (not shown in FIG. 8), which is coupled to the motor output shaft 608, is rotated away from the disengaged position sensor 356b, and toward the engaged position sensor 356a. As was noted above, the position sensors 356a, 356b and position semaphore 608 are configured such that the position semaphore 608 is disposed proximate the engaged position sensor 356a when the auxiliary bearing assemblies 354a, 354b engage, and thus rotationally support, the flywheel shaft assembly 502. Thus, when the auxiliary bearing actuator assembly 352 moves the auxiliary bearing assemblies 354a, 354b into the engaged position, the engaged position sensor 356a supplies an appropriate position signal to the auxiliary bearing controller 308.

Upon receipt of the appropriate position signal from the engaged position sensor 356a indicating that the auxiliary bearing assemblies 354a, 354b are in the engaged position, the auxiliary bearing assembly controller 308 will de-energize both the torque motor 606 and brake assembly 358. As a result, the torque motor 606 stops rotating, and the brake assembly 358 engages. It will be appreciated that auxiliary bearing controller 308 could be configured to de-energize the torque motor 606 and brake assembly 358 either simultaneously, or sequentially. The auxiliary bearing assemblies 354a, 354b will thus be locked in the engaged position until the auxiliary bearing controller issues a disengage command.

When the auxiliary bearing assemblies 354a, 354b are no longer needed to rotationally support the flywheel 310, the auxiliary bearing controller 308 issues the appropriate command signals to disengage the auxiliary bearing assemblies 354a, 354b. In particular, the auxiliary bearing controller 308 supplies a brake release command signal to the brake assembly 358 and a disengage command to the actuator assembly 352. Upon receipt of the brake release command, the brake assembly 358, as was described above, releases and allows movement of the auxiliary bearing actuator assembly 352.

The auxiliary bearing controller 308 additionally supplies a signal of appropriate polarity to the DC torque motor 606 to cause it to rotate, and thus supply a drive force, in the disengage direction. This signal may be supplied upon release of the brake assembly 358, or substantially simultaneous with supplying the brake release command. In any case, the actuator 604, in response to the drive force supplied from the torque motor 606, translates the touchdown cup 602 out of contact with the flywheel shaft assembly 502, which in turn causes the flywheel shaft assembly to disengage the other touchdown cup 702. Thus, the flywheel shaft assembly 502 will no longer be rotationally supported by the auxiliary bearing assemblies 354a, 354b.

The energy storage flywheel system and method described herein includes an auxiliary bearing control system 900 that rotationally supports the flywheel system rotating group when the primary means of rotational support is not available or is otherwise non-operable. The system 900 substantially eliminates, or at least lessens the likelihood of, damage occurring to the rotating group and/or auxiliary bearing assemblies when the auxiliary bearing assemblies are engaged while the rotating group is rotating at relatively high speeds.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An energy storage flywheel system, comprising:

a shaft;

a flywheel assembly mounted on the shaft;

one or more primary bearing assemblies each configured to selectively rotationally support the shaft;

one or more secondary bearing assemblies each configured to selectively rotationally support the shaft;

one or more secondary bearing position sensors each configured to supply position signals representative of a position of one or more of the secondary bearing assemblies;

a secondary bearing control circuit adapted to receive (i) one or more signals representative of primary bearing assembly operability and (ii) the secondary bearing assembly position signals and operable, in response thereto, to selectively supply actuator control signals; and one or more secondary bearing actuator assemblies each coupled to one or more of the secondary bearing assemblies, each actuator assembly further coupled to receive the actuator control signals from the control circuit and operable, in response thereto, to move the secondary bearing assemblies to one of (i) an engage position, in which each secondary bearing assembly rotationally supports the shaft, and (ii) a disengage position, in which each secondary bearing assembly does not rotationally supports the shaft.

2. The system of claim 1, wherein each secondary bearing actuator comprises:

a motor coupled to receive the actuator control signals and operable, in response thereto, to supply a drive force; and an actuator coupled to receive the drive force and operable, in response thereto, to selectively move one or more of the secondary bearing assemblies between the engage and disengage positions.

3. The system of claim 1, wherein the control circuit is further operable to selectively supply one or more brake control signals, and wherein each the system further comprises:

a brake assembly coupled to the secondary bearing actuator, the brake assembly further coupled to receive the brake control signals and operable, in response thereto, to selectively inhibit movement of one or more of the secondary bearing actuator assemblies.

4. The system of claim 3, wherein the brake assembly comprises:

a first plate coupled to the secondary bearing actuator assembly, the first plate having at least a first surface and a second surface, the first surface having a plurality of teeth formed thereon;

a second plate having at least a first surface and a second surface, the second plate second surface located substantially opposed to the first plate first surface and having a plurality of teeth formed thereon; and a brake actuator coupled to the second plate, the brake actuator coupled to receive the brake control signals and operable, in response thereto, to selectively move the second plate second surface into and out of engagement with the first plate first surface.

5. The system of claim 1, wherein each primary bearing assembly comprises a magnetic bearing assembly, each magnetic bearing assembly adapted to be selectively activated and deactivated, and configured, when activated, to rotationally mount the flywheel assembly in non-contact manner, and wherein the system further comprises:

a magnetic bearing control circuit configured to supply magnetic bearing activation control signals to each magnetic bearing assembly and adapted to receive one or more magnetic bearing monitor signals, the magnetic bearing control circuit further configured, in response to the magnetic bearing monitor signals, to supply the signals representative of primary bearing assembly operability to the secondary bearing control circuit.

6. The system of claim 1, wherein each of the secondary bearing assemblies comprises a mechanical bearing assembly.

7. The system of claim 1, wherein the secondary bearing control circuit is further adapted to receive a signal representative of an electrical system supply voltage and is further operable, in response thereto, to selectively supply the actuator control signals.

8. The system of claim 1, wherein each secondary bearing position sensor comprises a proximity sensor.

9. The system of claim 1, wherein the secondary bearing position sensors comprise:

an engage position sensor configured to supply an engage signal when the secondary bearing assemblies are at least in the engaged position; and a disengage position sensor configured to supply a disengage signal when the secondary bearing assemblies are at least in the disengaged position.

10. The system of claim 9, further comprising:

a sensor mount structure disposed proximate at least one secondary bearing actuator assembly, the sensor mount structure having a main body that includes at least a first end and a second end, the sensor mount structure first end having the engage position sensor mounted therein and the sensor mount structure second end having the disengage position sensor mounted therein;

a position semaphore having at least a first end and a second end, the position semaphore first end coupled to the at least one secondary bearing actuator assembly and moveable therewith and the position semaphore second end disposed between the sensor mount structure first and second ends, wherein the engage and disengage position sensors are each proximity sensors operable to supply position signals based on proximity thereto of the position semaphore.

11. The system of claim 1, further comprising:

one or more bearing mount structures each coupled to one of the secondary bearing assembly actuator assemblies, each bearing mount structure having one or more of the secondary bearing assemblies mounted thereon, wherein the secondary bearing actuator assemblies selectively move the bearing mount structures to thereby move the secondary bearing assemblies.

12. An auxiliary bearing control system for a shaft that is selectively rotationally supported by one or more primary bearing assemblies, comprising:

one or more secondary bearing assemblies each configured to selectively rotationally support the shaft;

one or more secondary bearing position sensors each configured to supply position signals representative of a position of one or more of the secondary bearing assemblies;

a secondary bearing control circuit adapted to receive (i) one or more signals representative of primary bearing assembly operability and (ii) the secondary bearing assembly position signals and operable, in response thereto, to selectively supply actuator control signals; and one or more secondary bearing actuator assemblies each coupled to one or more of the secondary bearing assemblies, each actuator assembly further coupled to receive the actuator control signals from the control circuit and operable, in response thereto, to move the secondary bearing assemblies to one of (i) an engage position, in which each secondary bearing assembly rotationally supports the shaft, and (ii) a disengage position, in which each secondary bearing assembly does not rotationally supports the shaft.

13. The system of claim 12, wherein each secondary bearing actuator comprises:

a motor coupled to receive the actuator control signals and operable, in response thereto, to supply a drive force; and an actuator coupled to receive the drive force and operable, in response thereto, to selectively move one or more of the secondary bearing assemblies between the engage and disengage positions.

14. The system of claim 12, wherein the control circuit is further operable to selectively supply one or more brake control signals, and wherein the system further comprises:

a brake assembly coupled to one or more of the secondary bearing actuator assemblies, the brake assembly further coupled to receive the brake control signals and operable, in response thereto, to selectively inhibit movement of one or more of the secondary bearing actuator assemblies.

15. The system of claim 14, wherein the brake assembly comprises:

a first plate coupled to the secondary bearing actuator assembly, the first plate having at least a first surface and a second surface, the first surface having a plurality of teeth formed thereon;

a second plate having at least a first surface and a second surface, the second plate second surface located substantially opposed to the first plate first surface and having a plurality of teeth formed thereon; and a brake actuator coupled to the second plate, the brake actuator coupled to receive the brake control signals and operable, in response thereto, to selectively move the second plate second surface into and out of engagement with the first plate first surface.

16. The system of claim 12, wherein the secondary bearing control circuit is further adapted to receive a signal representative of an electrical system supply voltage and is further operable, in response thereto, to selectively supply the actuator control signals.

17. The system of claim 12, wherein each secondary bearing position sensor comprises a proximity sensor.

18. The system of claim 12, wherein the secondary bearing position sensors comprise:
- an engage position sensor configured to supply an engage signal when the secondary bearing assemblies are at least in the engaged position; and
- a disengage position sensor configured to supply a disengage signal when the secondary bearing assemblies are at least in the disengaged position.

19. The system of claim 18, further comprising:
- a sensor mount structure disposed proximate at least one secondary bearing actuator assembly, the sensor mount structure having a main body that includes at least a first end and a second end, the sensor mount structure first end having the engage position sensor mounted therein and the sensor mount structure second end having the disengage position sensor mounted therein;
- a position semaphore having at least a first end and a second end, the position semaphore first end coupled to the at least one secondary bearing actuator assembly and moveable therewith and the position semaphore second end disposed between the sensor mount structure first and second ends,
- wherein the engage and disengage position sensors are each proximity sensors operable to supply position signals based on proximity thereto of the position semaphore.

20. The system of claim 12, further comprising:
- one or more bearing mount structures each coupled to one of the secondary bearing assembly actuator assemblies, each bearing mount structure having one or more of the secondary bearing assemblies mounted thereon,
- wherein the secondary bearing actuator assemblies selectively move the bearing mount structures to thereby move the secondary bearing assemblies.

21. In an energy storage flywheel system having at least a flywheel shaft and one or more primary bearing assemblies configured to selectively rotationally support the flywheel shaft, a method of selectively rotationally supporting the flywheel shaft via one or more secondary bearing assemblies, comprising:
- determining whether the primary bearing assemblies are operable to rotationally support the flywheel shaft;
- upon determining that the primary bearing assemblies are not operable to rotationally support the flywheel shaft, moving at least one of the secondary bearing assemblies from a disengaged position to an engaged position, to thereby rotationally support the flywheel shaft via the secondary bearing assemblies; and
- supplying a position signal representative of secondary bearing assembly position at least when one of the secondary bearing assemblies engages the shaft.

22. The method of claim 21, further comprising:
- selectively inhibiting movement of the at least one secondary bearing assembly in at least the engaged and disengaged positions.

23. The method of claim 21, wherein the energy storage flywheel system is adapted to electrically couple to an electrical distribution system, and wherein the method further comprises:
- determining a voltage magnitude of the electrical distribution system; and
- if the voltage magnitude is below a predetermined value, moving at least one of the secondary bearing assemblies from a disengaged position to an engaged position, to thereby rotationally support the flywheel shaft via the secondary bearing assemblies.

* * * * *

UNITED STATES PATENT AND TRADEMARK OFFICE
CERTIFICATE OF CORRECTION

PATENT NO. : 6,921,998 B2  
APPLICATION NO. : 10/686874  
DATED : July 26, 2005  
INVENTOR(S) : Giles et al.

Page 1 of 1

It is certified that error appears in the above-identified patent and that said Letters Patent is hereby corrected as shown below:

Column 1, add the following paragraph between the Title and Technical Field:

--STATEMENT REGARDING FEDERALLY SPONSORED RESEARCH OR DEVELOPMENT

This invention was made with government support under Agreement No. F29601-01-2-0046 awarded by the U.S. Air Force, Air Force Research Laboratory. The government has certain rights in this invention.--

Signed and Sealed this

Twentieth Day of March, 2007

JON W. DUDAS  
*Director of the United States Patent and Trademark Office*